United States Patent
Guo

(10) Patent No.: US 11,329,974 B2
(45) Date of Patent: May 10, 2022

(54) DEVICE NETWORK CONFIGURATION METHOD AND APPARATUS, AND STORAGE MEDIUM

(71) Applicant: Beijing Xiaomi Mobile Software Co., Ltd., Beijing (CN)

(72) Inventor: Shaolong Guo, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 189 days.

(21) Appl. No.: 16/929,739

(22) Filed: Jul. 15, 2020

(65) Prior Publication Data
US 2021/0266307 A1      Aug. 26, 2021

(30) Foreign Application Priority Data

Feb. 25, 2020   (CN) .......................... 202010115941.5

(51) Int. Cl.
*H04L 9/40*       (2022.01)
*H04W 8/00*      (2009.01)
(Continued)

(52) U.S. Cl.
CPC ............. *H04L 63/083* (2013.01); *H04W 8/24* (2013.01); *H04W 12/06* (2013.01); *H04W 76/10* (2018.02)

(58) Field of Classification Search
CPC ............ H04L 63/083; H04L 41/0866; H04L 41/0806; H04L 63/0876; H04W 8/24;
(Continued)

(56) References Cited

U.S. PATENT DOCUMENTS

2013/0333009 A1* 12/2013 Mackler ................. H04L 63/08
                                                                726/7
2016/0294828 A1   10/2016 Zakaria
(Continued)

FOREIGN PATENT DOCUMENTS

CN     108990053 A     12/2018
EP     1 806 897 A1     6/2006
(Continued)

OTHER PUBLICATIONS

European Search Report in European Application No. 20189594.3, dated Jan. 22, 2021.
(Continued)

*Primary Examiner* — Joseph E Dean, Jr.
(74) *Attorney, Agent, or Firm* — Finnegan, Henderson, Farabow, Garrett & Dunner, L.L.P.

(57) ABSTRACT

A device network configuration method, applied to a router, includes: sending, after establishing a first wireless connection with a device, a request for acquiring identity information of the device; receiving an identity data packet returned by the device; analyzing the data packet to acquire the identity information of the device; sending the identity information to a server; receiving, after the server verifies that the identity information is legal and sends first network configuration information comprising a username and an access password to a control end of the device, second network configuration information sent by the device, and verifying legality of the second network configuration information; and establishing, after a verification result is legal, a second wireless connection with the device; wherein the second network configuration information comprises the username and the access password in the first network configuration information.

20 Claims, 8 Drawing Sheets

(51) Int. Cl.
  *H04L 29/06* (2006.01)
  *H04W 76/10* (2018.01)
  *H04W 8/24* (2009.01)
  *H04W 12/06* (2021.01)

(58) Field of Classification Search
  CPC ..... H04W 12/06; H04W 76/10; H04W 8/005; H04W 12/068; H04W 84/12; H04W 48/16; H04W 12/12; H04W 12/69
  See application file for complete search history.

(56) References Cited

U.S. PATENT DOCUMENTS

| | | |
|---|---|---|
| 2018/0167392 A1 | 6/2018 | Zakaria |
| 2019/0158353 A1* | 5/2019 | Johnson ................. H04L 67/34 |
| 2020/0213307 A1 | 7/2020 | Zakaria |

FOREIGN PATENT DOCUMENTS

| | | |
|---|---|---|
| JP | 2017046337 A | 3/2017 |
| JP | 2018517319 A | 6/2018 |
| JP | 2019526122 A | 9/2019 |
| KR | 101716855 B1 | 3/2017 |
| KR | 20180102823 A | 9/2018 |
| WO | WO 2016/161027 A1 | 10/2016 |
| WO | WO 2019052532 A1 | 3/2019 |

OTHER PUBLICATIONS

Thomas Ulz et al., "Secured and Easy-to-Use NFC-Based Device Configuration for the Internet of Things", IEEE Journal of Radio Frequency Identification, IEEE, vol. 1, No. 1, Mar. 2017, pp. 75-84.
Grant of Patent of Korean Application No. 10-2020-0093922, dated Sep. 29, 2021.
Notice of Reasons for Refusal of Japanese Application No. 2020-128190, dated Oct. 5, 2021.

* cited by examiner

DEVICE NETWORK CONFIGURATION METHOD AND APPARATUS, AND STORAGE MEDIUM

CROSS-REFERENCE TO RELATED APPLICATIONS

This application is based upon and claims priority to Chinese Patent Application No. 202010115941.5, filed on Feb. 25, 2020, the entire content of which is incorporated herein by reference.

TECHNICAL FIELD

The present disclosure relates to the field of device network configuration, and more particularly, to a device network configuration method and apparatus, and a storage medium.

BACKGROUND

Conventionally, a device may need to establish a wireless fidelity (WIFI) connection with a router when accessing a local area network (LAN). The establishing of the connection may require a user to perform multi-step operations via an application (APP) on an intelligent terminal, such as a mobile phone, a personal access device (PAD), and the like. The multi-step operations may cause inconvenience to the user, during the establishment process of the WIFI connection between the device and the router.

SUMMARY

According to a first aspect of embodiments of the present disclosure, a device network configuration method, applied to a router, includes: sending, after establishing a first wireless connection with a device, a request for acquiring identity information of the device; receiving an identity data packet returned by the device; analyzing the data packet to acquire the identity information of the device; sending the identity information to a server; receiving, after the server verifies that the identity information is legal and sends first network configuration information comprising a username and an access password to a control end of the device, second network configuration information sent by the device, and verifying legality of the second network configuration information; and establishing, after a verification result is legal, a second wireless connection with the device, wherein the second network configuration information comprises the username and the access password in the first network configuration information.

According to a second aspect of embodiments of the present disclosure, a device network configuration method, applied to a device, includes: receiving, after establishing a first wireless connection with a router, a request for acquiring identity information of the device from the router; sending an identity data packet to the router; acquiring a two-dimensional code representing a username and an access password from a control end of the device; generating second network configuration information based on the username and the access password; and sending the second network configuration information to the router, and establishing a second wireless connection with the router to complete network configuration.

According to a third aspect of embodiments of the present disclosure, a router includes: a processor, and a memory configured to store instructions executable by the processor. The processor is configured to: send, after establishing a first wireless connection with a device, a request for acquiring identity information of the device; receive an identity data packet returned by the device; analyze the data packet to acquire the identity information of the device; send the identity information to a server; receive, after the server verifies that the identity information is legal and sends first network configuration information including a username and an access password to a control end of the device, second network configuration information sent by the device and verify legality of the second network configuration information; and establish, after a verification result is legal, a second wireless connection with the device, wherein the second network configuration information includes the username and the access password in the first network configuration information.

According to a fourth aspect of embodiments of the present disclosure, a device includes: a processor, and a memory configured to store instructions executable by the processor. The processor is configured to: receive, after establishing a first wireless connection with a router, a request for acquiring identity information of the device from the router; send an identity data packet to the router; acquire a two-dimensional code representing a username and an access password from a control end of the device; generate second network configuration information based on the username and the access password; and send the second network configuration information to the router, and establish a second wireless connection with the router to complete network configuration.

It is to be understood that the above general description and detailed description below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Conventionally, when a device accesses to a local area network (LAN), a user may be required to perform multi-step operations. For example, the user needs to turn on a mobile phone, actively scan the uninitialized device, and manually input a username and a password, thus completing network configuration of the device. A user with insufficient professional knowledge may not be able to complete the multi-step operations, e.g., the user is unable to operate an application (APP) configuring the device, and the password may also be forgotten by the user. As a result, inconvenience is caused for the user to use the device.

The present disclosure provides a device network configuration method. In the method, an uninitialized device is found by a router; when a user inputs and binds account information of the router, such as a username and a password, on an APP, manual operations in a network configuration process of the device may not be needed; and with interaction between the router and the device, the APP and a server, an Internet-surfing configuration operation and an account binding operation of the device are completed automatically. By adopting the method, convenience is provided to improve user experience.

Figure 1:
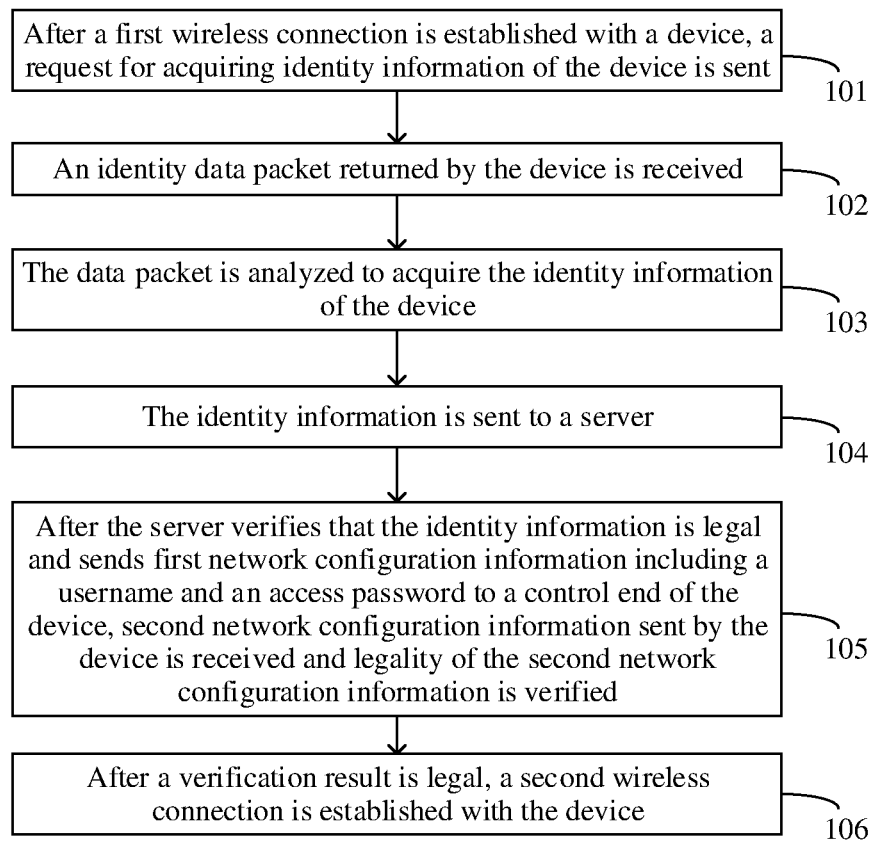
FIG. 1 is a flow chart showing a device network configuration method applied to a router, according to an exemplary embodiment.

FIG. 1 is a flow chart showing a device network configuration method, according to an exemplary embodiment. For example, the method may be applied to a router. Referring to FIG. 1, the method may include the following operations.

At 101, after a first wireless connection is established with a device, a request for acquiring identity information of the device is sent.

At 102, an identity data packet returned by the device is received.

At 103, the data packet is analyzed to acquire the identity information of the device.

At 104, the identity information is sent to a server.

At 105, after the server verifies that the identity information is legal and sends first network configuration information including a username and an access password to a control end of the device, second network configuration information sent by the device is received, and legality of the second network configuration information is verified.

At 106, after a verification result is legal, a second wireless connection is established with the device.

In an embodiment, the second network configuration information includes the username and the access password in the first network configuration information.

After acquiring the identity information of the device, the router sends the identity information to the server, such that the server verifies the device according to the identity information. The identity information of the device that is acquired by the router includes a device identifier and a device random number, which will be described below in detail.

In addition, the network configuration information may include a username and an access password of a network to which the router belongs.

The router may be implemented with a 2.4 G dedicated chip (such as a WIFI-SCAN chip). The dedicated chip is configured to find a surrounding uninitialized device in real time. By using the dedicated chip to scan the device in real time, the interference on a 2.4 G master chip of the router may be reduced. In addition, by scanning the device via the dedicated chip of the router, the user does not need to manually trigger an APP for scanning, and timeliness and usability of the method are reinforced.

In the embodiment, the router acquires the identity information of the device and sends the identity information to the server, such that a manner in which the identity information of the device is acquired by the APP is replaced, and manual operations of the user are reduced.

In an embodiment, the identity information includes a device identifier and a device random number of the device; and the identity information is configured to cause the server to determine, according to the identity information, a source of the device and whether initialization is completed. If the source is legal and the initialization is not completed, the verification result is legal.

The device identifier is a unique identifier of the device, and is configured to uniquely identify an identity of the device. The device random number is a random number generated by the device, and is configured to further verify the identity of the device, so as to prevent an illegal device from illegally connecting to the router by tampering its own device identifier into a legal device identifier. That is, the device random number includes information such as time information on the operation of the device, and the like, so as to prevent the illegal connection of the illegal device by verifying whether the random number is consistent in subsequent information interaction. The specific verification process may be implemented by those skilled in the art in a known manner, and will not be elaborated herein.

In an embodiment, the identity information may include no device random number. In an embodiment, to implement higher safety, the acquired identity information of the device includes the device identifier and the device random number.

In an embodiment, the method may further include that: a data packet broadcast by the device is scanned and received, and the data packet is analyzed to acquire a network identifier; and after it is determined that the network identifier meets a preset rule, the first wireless connection is established with the device.

In an embodiment, when the device is powered on and in an access mode, the data packet is broadcast. The data packet includes the network identifier. The network identifier may be generated by the device according to a preset rule stored therein, such that the router can analyze the network identifier according to the same preset rule. The network identifier may be a service set identifier (SSID).

In an embodiment, when the router receives the network identifier broadcast by the device, it may be determined that the device is to perform Internet-surfing configuration. Hence, the router determines to execute the subsequent operation of acquiring the identity information of the device for network configuration. Upon the reception of the network identifier, such as the SSID, broadcast by the device, the router analyzes the SSID, and determines whether the SSID meets the preset rule, i.e., whether the device identified by the SSID is an legal device of the network to which the router belongs, for example, whether the device includes an identifier of a set manufacturer. When it is determined that the SSID meets the preset rule, the request for acquiring the identity information of the device is sent.

In an embodiment, the first wireless connection is, for example, an 802.11 protocol-based wireless connection. By means of the first wireless connection, the device may send the IP address to the router, such that the router communicates with the device via the IP address.

In an embodiment, the operation that the request for acquiring the identity information of the device is sent may include that: an IP address of the device is acquired via the first wireless connection, and the request for acquiring the identity information of the device is sent to the IP address; or the request for acquiring the identity information of the device is broadcast.

In the first manner, the router establishes the wireless connection, such as the 802.11 protocol-based wireless connection, with the device identified by a received SSID, acquires the IP address of the device, and sends the request for acquiring the identity information of the device to the IP address. In this manner, the router sends the request by means of the connection established with the device.

In the second manner, the router does not need to establish the connection with the device identified the received SSID but broadcasts the request for acquiring the identity information of the device. After the device receives the broadcast message and analyzes the broadcast message to determine that its own identity information is requested by the router, the identity information is sent to the router. As no WIFI connection is established between the router and the device, the device may also send the identity information via a broadcast manner.

Upon the reception of the SSID of the device, the router may analyze model information of the device according to the SSID, i.e., information of a manufacturer producing the device, such that the router sends the information of the manufacturer to the server together when sending the identity information of the device to the server. In this way, the server may make a statistic of the device based on the information of the manufacturer conveniently.

In an embodiment, the second network configuration information is acquired by the control end of the device according to a two-dimensional code generated by using the username and the password in the first network configuration information; and the first network configuration information includes: the username, the access password, the device identifier and the device random number.

Figure 2:
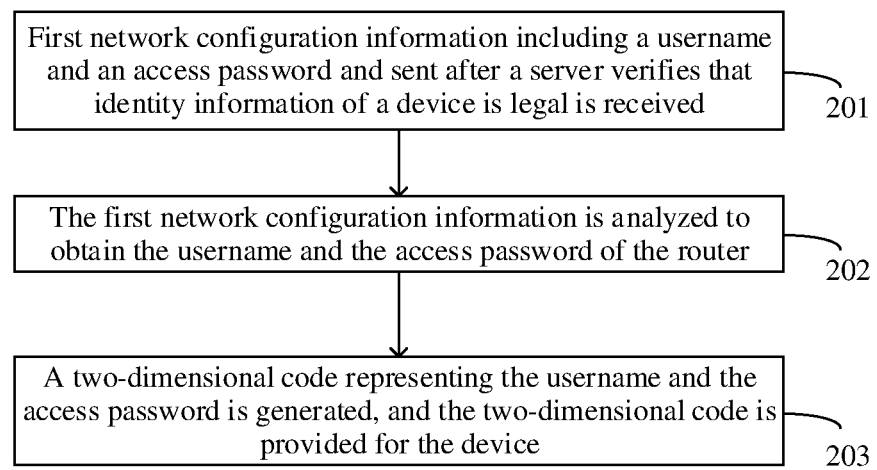
FIG. 2 is a flow chart showing a device network configuration method applied to a control end of a device, according to an exemplary embodiment.

FIG. 2 is a flow chart showing a device network configuration method, according to an exemplary embodiment. For example, the method may be applied to a control end of a device for configuring a network with a router. Referring to FIG. 2, the method may include the following operations.

At 201, first network configuration information including a username and an access password and sent after a server verifies that identity information of a device is legal is received.

At 202, the first network configuration information is analyzed to obtain the username and the access password of the router.

At 203, a two-dimensional code representing the username and the access password is generated, and the two-dimensional code is provided for the device.

The control end of the device may be, for example, arranged on an intelligent terminal (such as a mobile phone, a PAD and a wearable device). The operation of the control end may be, for example, implemented by an APP on the intelligent terminal.

As described above, at 105 (FIG. 1), the server verifies that the identity information is legal and sends the first network configuration information including the username and the access password to the control end of the device, and the server acquires the username and the access password of the router based on the first network configuration information, and provides the username and the access password for the device in a manner of the two-dimensional code, such that the device establishes the connection with the router based on the username and the access password.

It is to be noted that the two-dimensional code representing the username and the access password may also be generated into other expression forms, provided that the device can acquire the username and the password from the device.

By adopting the above method, the interaction between the control end and the device is simple and convenient for user operation, and the complex interaction process in the conventional art does not need to be performed; and therefore, the user operation is simplified, and user experience is improved.

In an embodiment, the method may further include that: network configuration success information returned by the device is received, and a network configuration success is reported to the server, to complete binding.

In the embodiment, the control end reports the network configuration success to the server, thus completing the binding. The control end performs a reduced number operations during the whole network configuration process, thus greatly reducing the workload of the user.

Figure 3:
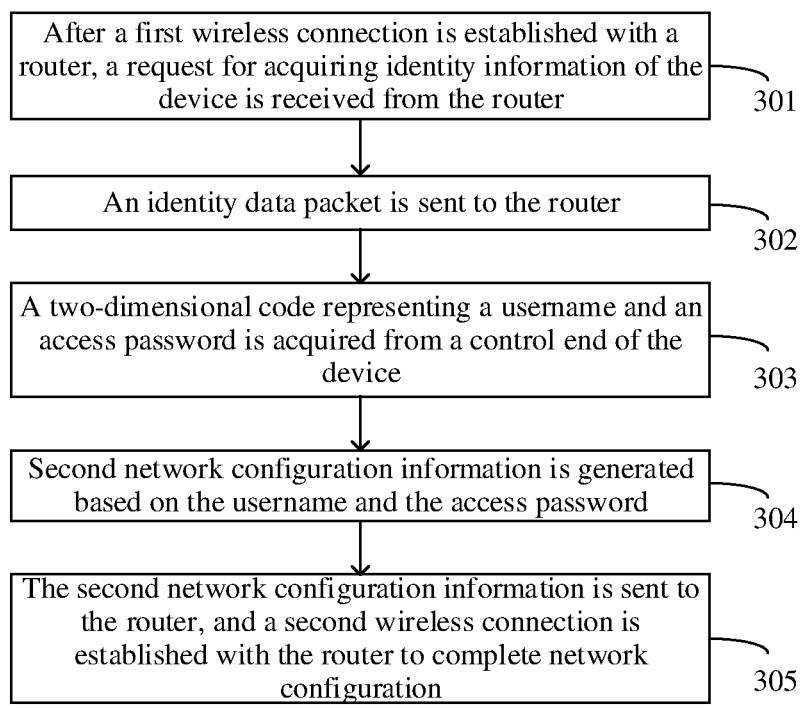
FIG. 3 is a flow chart showing a device network configuration method applied to a device, according to an exemplary embodiment.

FIG. 3 is a flow chart showing a device network configuration method, according to an exemplary embodiment. For example, the device network configuration method may be applied to a device. Referring to FIG. 3, the method may include the following operations.

At 301, after a first wireless connection is established with a router, a request for acquiring identity information of the device is received from the router.

At 302, an identity data packet is sent to the router.

At 303, a two-dimensional code representing a username and an access password is acquired from a control end of the device.

At 304, second network configuration information is generated based on the username and the access password.

At 305, the second network configuration information is sent to the router, and a second wireless connection is established with the router to complete network configuration.

The device may establish the WIFI connection with the router, receive the request for acquiring the identity information from the router via the WIFI connection, and then send its own identity information to the router via the WIFI connection. The device may also not establish the WIFI connection with the router but receives the request for acquiring the identity information broadcast by the router and then broadcasts its own identity information.

In an embodiment, the device may acquire the network configuration information of the router by scanning the two-dimensional code generated by the control end, i.e., acquire the username and the access password of the network to which the router belongs, and establish the connection with the router based on the username and the access password. The process that the device establishes the connection with the router via the username and the access password may be implemented by those skilled in the art in a known manner, and will not be elaborated herein.

In an embodiment, the method may further include that: network configuration success information is sent to the control end.

After establishing the connection with the router, the device sends a network configuration success message to the APP, and exits from the access mode to enter a client mode.

In an embodiment, the method may further include that: in response to the device being in an access mode, a data packet is broadcast, and the data packet includes a network identifier.

In an embodiment, the operation that the request for acquiring the identity information of the device is received from the router may include that: an IP address of the device is sent to the router via the first wireless connection, and the request for acquiring the identity information of the device is received via the IP address; or the request for acquiring the identity information of the device broadcast by the router is received.

For details of the above process, reference may be made to the description of the network configuration method applied to the router, which will not be elaborated herein.

In the implementation process of the method, in addition to acquiring the username and the password of the network to which the router belongs by scanning the two-dimensional code generated by the APP, the device also interacts with the router. The interaction with the router is completed automatically without intervention of the user, thus facilitating user operations, and improving the user experience.

In an embodiment, the identity information includes a device identifier and a device random number of the device.

The identity information is configured to cause a server to determine, according to the identity information, a source of the device and whether initialization is completed; and if the source is legal and the initialization is not completed, a verification result is legal.

As described above, the device identifier is a unique identifier of the device, and is configured to uniquely identify an identity of the device. The device random number is a random number generated by the device, and is configured to further verify the identity of the device, so as to prevent an illegal device from illegally connecting to the router by tampering an own device identifier into a legal device identifier. In an embodiment, the identity information may include no device random number. In an embodiment, to implement higher safety, the acquired identity information of the device may include the device identifier and the device random number.

Figure 4:
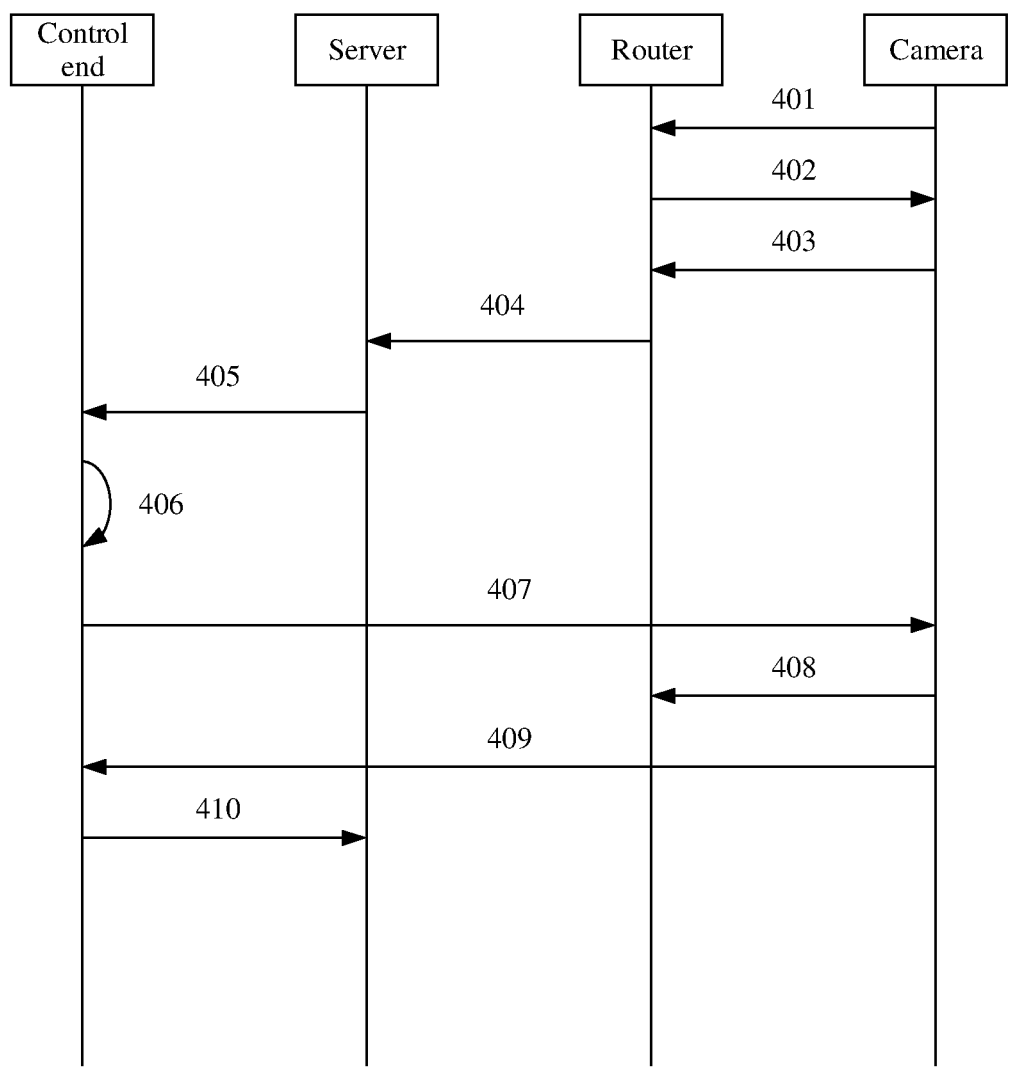
FIG. 4 is a flow chart showing a device network configuration method, according to an exemplary embodiment.

FIG. 4 illustrates a flow chart of a device network configuration method, according to an exemplary embodiment. For example, in the method, the router may be an artificial intelligence plus internet of things (AIOT) router, and the device may be a camera. For example, use of the camera may involve sensitive information. As illustrated in FIG. 4, the method may include the following operation.

At 401, when a camera is powered on and is not configured with a network, the camera is in an access mode and broadcasts an SSID of the camera.

At 402, a dedicated WIFI-SCAN chip of an AIOT router scans a surrounding wireless signal in real time, analyzes the SSID upon the reception of an SSID broadcast packet, and establishes, if the SSID meets a preset rule, an 802.11 protocol-based wireless connection with the corresponding camera, acquires an IP address of the camera, and sends a request packet to the IP address for acquiring identity information of the camera, including a device identifier and a device random number.

At 403, the camera sends its own device identifier and device random number upon the reception of the request of the AIOT router.

At 404, the AIOT router analyzes a model (including information of a manufacturer) of the camera according to the SSID of the camera, and sends the device identifier, the device random number and the model of the camera to a server.

At 405, the server verifies, upon the reception of information sent from the AIOT router, whether the camera is a device that is produced by a preset manufacturer and uninitialized according to the device identifier; if yes, the device identifier and the device random number are sent to a control end, such as an APP on a mobile phone.

At 406, the APP generates, according to the device identifier and the device random number as well as a previously stored username and access password of a network to which the router belongs, a two-dimensional code and displays the two-dimensional code.

At 407, the camera scans the two-dimensional code displayed by the APP, and acquires the username and the access password based on the two-dimensional code.

At 408, the camera establishes a connection with the AIOT router by using the username and the password, thus completing network configuration.

At 409, the camera sends a network configuration success message to the APP.

At 410, the APP sends the network configuration success message to the server and completes binding with the camera.

In the above process, during the device network configuration process, manual operations of the user may not be needed, and the information interaction is directly performed among the router, the camera, the server and the APP, thus completing the network configuration process.

Figure 5:
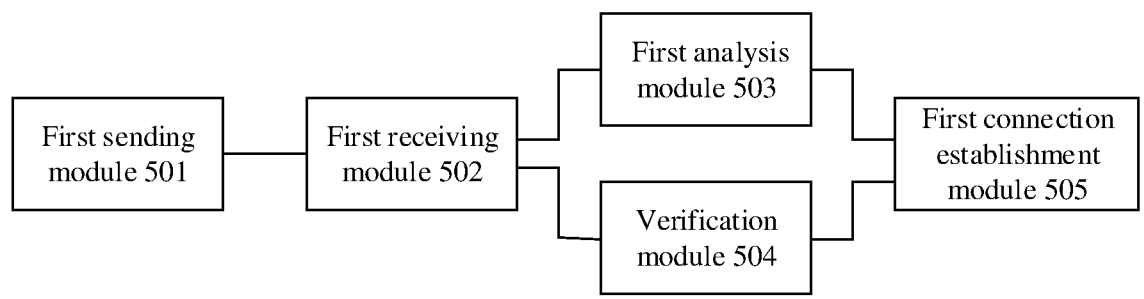
FIG. 5 is a block diagram of a device network configuration apparatus applied to a router, according to an exemplary embodiment.

FIG. 5 is a block diagram of a device network configuration apparatus according to an exemplary embodiment. As illustrated in FIG. 5, the apparatus is applied to a router and may include: a first sending module 501, a first receiving module 502, a first analysis module 503, a verification module 504, and a first connection establishment module 505.

The first sending module 501 is configured to send, after establishing a first wireless connection with a device, a request for acquiring identity information of the device, and send, after acquiring the identity information of the device, the identity information to a server.

The first receiving module 502 is configured to receive an identity data packet returned by the device, and receive, after the server verifies that the identity information is legal and sends first network configuration information including a username and an access password to a control end of the device, second network configuration information sent by the device.

The first analysis module 503 is configured to analyze the data packet to acquire the identity information of the device.

The verification module 504 is configured to verify legality of the second network configuration information.

The first connection establishment module 505 is configured to establish, after a verification result of the verification module is legal, a second wireless connection with the device.

The second network configuration information may include the username and the access password in the first network configuration information.

In an embodiment, the first receiving module 502 is further configured to scan and receive a data packet broadcast by the device; the first analysis module 503 is further configured to analyze the data packet to obtain a network identifier; and the first connection establishment module 505 is further configured to establish, after determining that the network identifier meets a preset rule, the first wireless connection with the device.

In an embodiment, the first sending module 501 is further configured to send, via a following manner, the request for acquiring the identity information of the device: an IP address of the device is acquired via the first wireless connection, and the request for acquiring the identity information of the device is sent to the IP address; or the request for acquiring the identity information of the device is broadcast.

In an embodiment, the identity information includes a device identifier and a device random number of the device; and the identity information is configured to cause the server to determine, according to the identity information, a source of the device and whether initialization is completed. If the source is legal and the initialization is not completed, the verification result is legal.

In an embodiment, the second network configuration information is acquired by the control end of the device according to a two-dimensional code generated by using the username and the password in the first network configuration information; and the first network configuration information includes: the username, the access password, the device identifier and the device random number.

Figure 6:
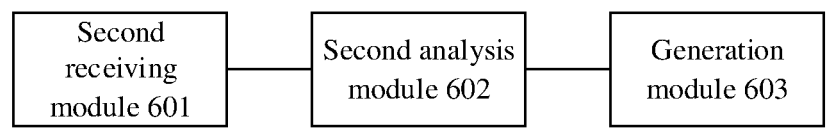
FIG. 6 is a block diagram of a device network configuration apparatus applied to a control end of a device, according to an exemplary embodiment.

FIG. 6 is a block diagram of a device network configuration apparatus according to an exemplary embodiment. For example, the apparatus is applied to a control end of a device for configuring a network with a router. As illustrated in FIG. 6, the apparatus may include: a second receiving module 601, a second analysis module 602, and a generation module 603.

The second receiving module 601 is configured to receive first network configuration information including a username and an access password and sent after a server verifies that identity information of the device is legal.

The second analysis module 602 is configured to analyze the first network configuration information to obtain the username and the access password of the router.

The generation module 603 is configured to generate a two-dimensional code representing the username and the access password, and provide the two-dimensional code for the device.

In an embodiment, the second receiving module 601 is further configured to receive network configuration success information returned by the device; and the apparatus may further include: a second sending module, and a binding module.

The second sending module is configured to report a network configuration success to the server after the second receiving module 601 receives the network configuration success information returned by the device.

The binding module is configured to complete binding after the second receiving module 601 receives the network configuration success information returned by the device.

Figure 7:
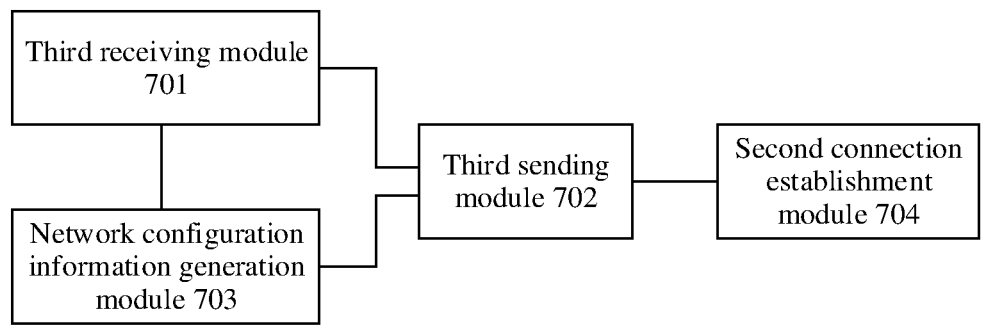
FIG. 7 is a block diagram of a device network configuration apparatus applied to a device, according to an exemplary embodiment.

FIG. 7 is a block diagram of a device network configuration apparatus according to an exemplary embodiment. For example, the apparatus is applied to a device. As illustrated in FIG. 7, the apparatus may include: a third receiving module 701, a third sending module 702, a network configuration information generation module 703, and a second connection establishment module 704.

The third receiving module 701 is configured to receive, after establishing a first wireless connection with a router, a request for acquiring identity information of the device from the router, and acquire a two-dimensional code representing a username and an access password from a control end of the device.

The third sending module 702 is configured to send an identity data packet to the router, and send second network configuration information to the router.

The network configuration information generation module 703 is configured to generate the second network configuration information based on the username and the access password.

The second connection establishment module 704 is configured to establish, after sending the second network configuration information to the router, a second wireless connection with the router to complete network configuration.

In an embodiment, the third sending module 702 is further configured to: send network configuration success information to the control end.

In an embodiment, the apparatus may further include a broadcast module, configured to broadcast, in response to the device in an access mode, a data packet, and the data packet includes a network identifier.

In an embodiment, the third sending module 702 is further configured to send an IP address of the device to the router via the first wireless connection; and the third receiving module 701 is further configured to receive, via the IP address, the request for acquiring the identity information of the device; or receive the request for acquiring the identity information of the device broadcast by the router.

In an embodiment, the identity information includes a device identifier and a device random number of the device; and the identity information is configured to cause a server to determine, according to the identity information, a source of the device and whether initialization is completed. If the source is legal and the initialization is not completed, a verification result is legal.

The present disclosure further provides a device network configuration apparatus, which may include: a processor, and a memory configured to store instructions executable by the processor. The processor is configured to: send, after establishing a first wireless connection with a device, a request for acquiring identity information of the device; receive an identity data packet returned by the device; analyze the data packet to acquire the identity information of the device; send the identity information to a server; receive, after the server verifies that the identity information is legal and sends first network configuration information including a username and an access password to a control end of the device, second network configuration information sent by the device and verify legality of the second network configuration information; and establish, after a verification result is legal, a second wireless connection with the device. The second network configuration information may include the username and the access password in the first network configuration information.

The present disclosure further provides a non-transitory computer-readable storage medium; and instructions in the storage medium are executed by a processor of a router to execute a device network configuration method, and the method may include that: after a first wireless connection is established with a device, a request for acquiring identity information of the device is sent; an identity data packet returned by the device is received; the data packet is analyzed to acquire the identity information of the device; the identity information is sent to a server; after the server verifies that the identity information is legal and sends first network configuration information including a username and an access password to a control end of the device, second network configuration information sent by the device is received and legality of the second network configuration information is verified; and after a verification result is legal, a second wireless connection is established with the device. The second network configuration information may include the username and the access password in the first network configuration information.

The present disclosure further provides a device network configuration apparatus, which may include: a processor, and a memory configured to store instructions executable by the processor. The processor is configured to: receive, after establishing a first wireless connection with a router, a request for acquiring identity information of the device from the router; send an identity data packet to the router; acquire a two-dimensional code representing a username and an access password from a control end of the device; generate second network configuration information based on the username and the access password; and send the second network configuration information to the router, establish a second wireless connection with the router to complete network configuration.

The present disclosure further provides a non-transitory computer-readable storage medium; and instructions in the storage medium are executed by a processor of a device to execute a device network configuration method, and the method may include that: after a first wireless connection is established with a router, a request for acquiring identity information of the device is received from the router; an identity data packet is sent to the router; a two-dimensional code for characterizing a username and an access password is acquired from a control end of the device; second network configuration information is generated based on the username and the access password; and the second network configuration information is sent to the router, and a second wireless connection is established with the router to complete network configuration.

In the above embodiments, an uninitialized device is found by the router; when the user inputs and binds account information of the router on the APP such as the username and the password, manual operations in a network configuration process of the device may not be needed; and with interaction between the router and the device, the APP and the server, an Internet-surfing configuration operation and an account binding operation of the device are completed automatically. As a result, convenience is provided in user operations, thereby improving user experience.

Figure 8:
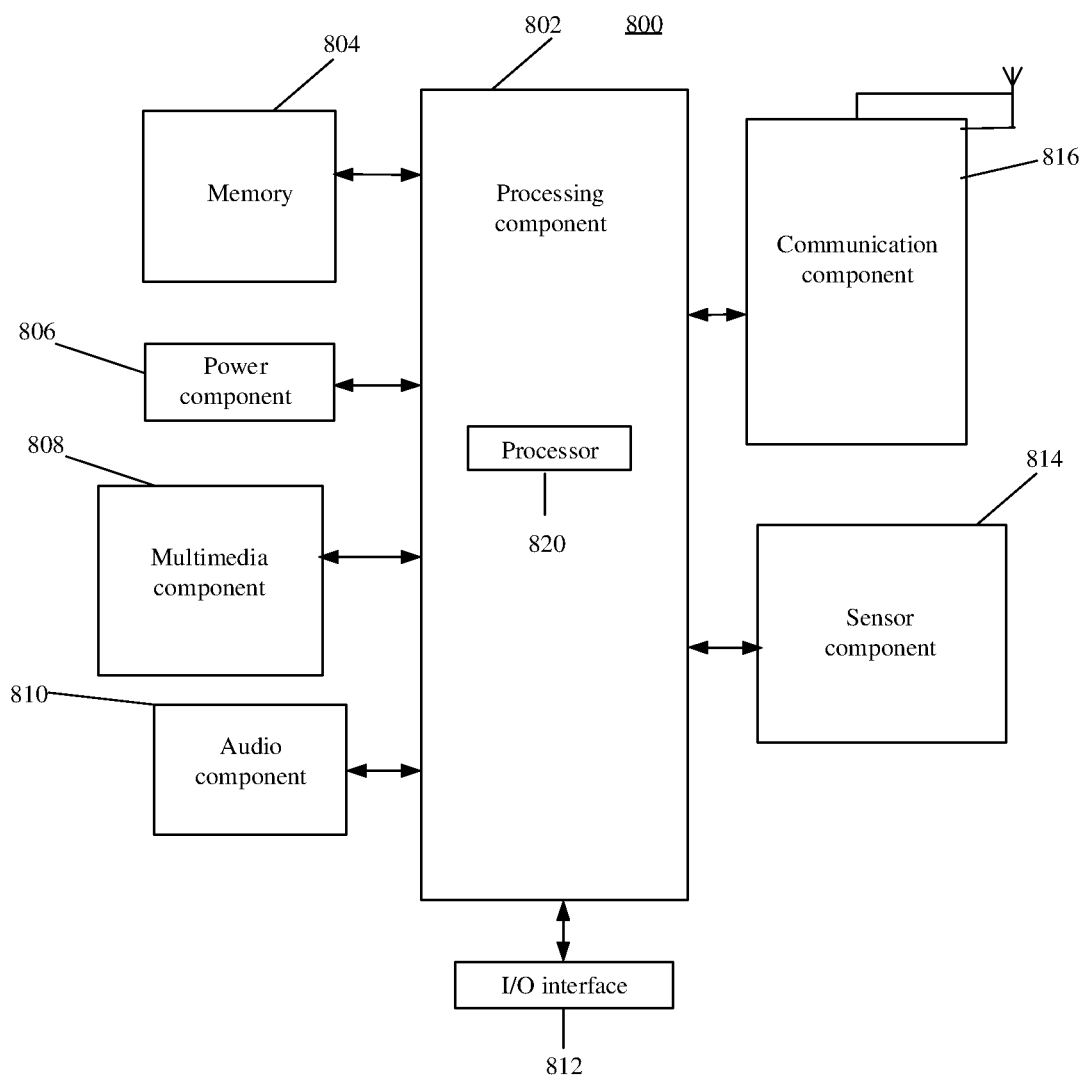
FIG. 8 is a block diagram of an apparatus, according to an exemplary embodiment.

FIG. 8 is a block diagram of a device network configuration apparatus 800 according to an exemplary embodiment. For example, the apparatus 800 may be any of the router, device, server, or control end described above.

Referring to FIG. 8, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the operations in the above described methods. Moreover, the processing component 802 may include one or more modules which facilitate interaction between the processing component 802 and other components. For instance, the processing component 802 may include a multimedia module to facilitate interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 806 provides power to various components of the apparatus 800. The power component 806 may include a power management system, one or more power supplies, and other components associated with generation, management, and distribution of power for the apparatus 800.

The multimedia component 808 includes a screen providing an output interface between the apparatus 800 and a user. In some embodiments, the screen may include a liquid crystal display (LCD) and a touch panel (TP). If the screen includes the TP, the screen may be implemented as a touch screen to receive an input signal from the user. The TP includes one or more touch sensors to sense touches, swipes, and gestures on the TP. The touch sensors may not only sense a boundary of a touch or swipe action, but also detect a period of time and a pressure associated with the touch or swipe action. In some embodiments, the multimedia component 808 includes a front camera and/or a rear camera. The front camera and/or the rear camera may receive external multimedia data when the apparatus 800 is in an operation mode, such as a photographing mode or a video mode. Each of the front camera and the rear camera may be a fixed optical lens system or have focusing and optical zooming capabilities.

The audio component 810 is configured to output and/or input an audio signal. For example, the audio component 810 includes a microphone (MIC) configured to receive an external audio signal when the apparatus 800 is in an operation mode, such as a call mode, a recording mode, and a voice recognition mode. The received audio signal may further be stored in the memory 804 or sent via the communication component 816. In some embodiments, the audio component 810 further includes a speaker configured to output the audio signal.

The I/O interface 812 provides an interface between the processing component 802 and peripheral interface modules, such as a keyboard, a click wheel, buttons, and the like. The buttons may include, but are not limited to: a home button, a volume button, a starting button, and a locking button.

The sensor component 814 includes one or more sensors configured to provide status assessments of various aspects of the apparatus 800. For instance, the sensor component 814 may detect an on/off status of the apparatus 800 and relative positioning of components, such as a display and small keyboard of the apparatus 800, and the sensor component 814 may further detect a change in a position of the apparatus 800 or a component of the apparatus 800, presence or absence of contact between the user and the apparatus 800, orientation or acceleration/deceleration of the apparatus 800 and a change in temperature of the apparatus 800. The sensor component 814 may include a proximity sensor configured to detect presence of an object nearby without any physical contact. The sensor component 814 may also include a light sensor, such as a complementary metal oxide semiconductor (CMOS) or charge coupled device (CCD) image sensor, configured for use in an imaging application. In some embodiments, the sensor component 814 may also include an accelerometer sensor, a gyroscope sensor, a magnetic sensor, a pressure sensor, or a temperature sensor.

The communication component 816 is configured to facilitate wired or wireless communication between the apparatus 800 and other devices. The apparatus 800 may access a communication-standard-based wireless network, such as a wireless fidelity (WiFi) network, a 4th-generation (4G) or 5th-generation (5G) network or a combination thereof. In an exemplary embodiment, the communication component 816 receives a broadcast signal or broadcast associated information from an external broadcast management system via a broadcast channel. In an exemplary embodiment, the communication component 816 further includes a near field communication (NFC) module to facilitate short-range communications. In an exemplary embodiment, the communication component 816 may be implemented based on a radio frequency identification (RFID) technology, an infrared data association (IrDA) technology, an ultra-wide band (UWB) technology, a Bluetooth (BT) technology, and other technologies.

In exemplary embodiments, the apparatus 800 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, and is configured to perform the above described methods.

In an exemplary embodiment, there is also provided a non-transitory computer-readable storage medium including instructions, such as included in the memory 804, executed by the processing component 820 of the apparatus 800 for performing the above methods. For example, the non-transitory computer-readable storage medium may be an ROM, a random access memory (RAM), a compact disc read-only memory (CD-ROM), a magnetic tape, a floppy disc, an optical data storage device, and the like.

In an embodiment, a non-transitory computer-readable storage medium is provided; and instructions in the storage medium are executed by a processor of a mobile terminal to cause the mobile terminal to execute a device network configuration method. The method may include that: first network configuration information including a username and an access password is received after a server verifies that identity information of a device is legal; the first network configuration information is analyzed to obtain the username and the access password of the router; and a two-dimensional code for characterizing the username and the access password is generated, and provided for the device.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A device network configuration method, applied to a router, comprising:
    sending, after establishing a first wireless connection with a device, a request for acquiring identity information of the device;
    receiving an identity data packet returned by the device;
    analyzing the data packet to acquire the identity information of the device;
    sending the identity information to a server;
    receiving, after the server verifies that the identity information is legal and sends first network configuration information comprising a username and an access password to a control end of the device, second network configuration information sent by the device, and verifying legality of the second network configuration information; and
    establishing, after a verification result is legal, a second wireless connection with the device;
    wherein the second network configuration information comprises the username and the access password in the first network configuration information.

2. The method of claim 1, further comprising:
    scanning and receiving a data packet broadcast by the device, and analyzing the data packet to acquire a network identifier; and
    establishing, after determining that the network identifier meets a preset rule, the first wireless connection with the device.

3. The method of claim 1, wherein sending the request for acquiring the identity information of the device comprises one of:
    acquiring an Internet protocol (IP) address of the device via the first wireless connection, and sending the request for acquiring the identity information of the device to the IP address; or
    broadcasting the request for acquiring the identity information of the device.

4. The method of claim 1, wherein the identity information comprises a device identifier and a device random number of the device;
    wherein the identity information is configured to cause the server to determine, according to the identity information, a source of the device and whether initialization is completed; and in response to the source being legal and the initialization not being completed, the verification result is legal.

5. The method of claim 1, wherein the second network configuration information is acquired by the control end of the device according to a two-dimensional code generated by using the username and the access password in the first network configuration information; and the first network configuration information comprises: the username, the access password, and a device identifier and a device random number of the device.

6. A device network configuration method, applied to a device, comprising:
    receiving, after establishing a first wireless connection with a router, a request for acquiring identity information of the device from the router;

sending an identity data packet to the router;
acquiring a two-dimensional code representing a username and an access password from a control end of the device;
generating second network configuration information based on the username and the access password; and
sending the second network configuration information to the router, and establishing a second wireless connection with the router to complete network configuration.

7. The method of claim 6, further comprising:
sending network configuration success information to the control end.

8. The method of claim 6, further comprising:
broadcasting, in response to the device in an access mode, a data packet, the data packet comprising a network identifier.

9. The method of claim 6, wherein receiving the request for acquiring the identity information of the device from the router comprises one of:
sending an Internet protocol (IP) address of the device to the router via the first wireless connection, and receiving, via the IP address, the request for acquiring the identity information of the device; or
receiving the request for acquiring the identity information of the device broadcast by the router.

10. The method of claim 6, wherein the identity information comprises a device identifier and a device random number of the device;
wherein the identity information is configured to cause a server to determine, according to the identity information, a source of the device and whether initialization is completed; and in response to the source being legal and the initialization being not completed, a verification result is legal.

11. A router, comprising:
a processor; and
a memory for storing instructions executable by the processor;
wherein the processor is configured to:
send, after establishing a first wireless connection with a device, a request for acquiring identity information of the device, and send, after acquiring the identity information of the device, the identity information to a server;
receive an identity data packet returned by the device, and receive, after the server verifies that the identity information is legal and sends first network configuration information comprising a username and an access password to a control end of the device, second network configuration information sent by the device;
analyze the data packet to acquire the identity information of the device;
verify legality of the second network configuration information; and
establish, after a verification result is legal, a second wireless connection with the device;
wherein the second network configuration information comprises the username and the access password in the first network configuration information.

12. The router of claim 11, wherein the processor is further configured to: scan and receive a data packet broadcast by the device; analyze the data packet to obtain a network identifier; and establish, after determining that the network identifier meets a preset rule, the first wireless connection with the device.

13. The router of claim 11, wherein in sending the request for acquiring the identity information of the device, the processor is further configured to perform one of:
acquiring an Internet protocol (IP) address of the device via the first wireless connection, and sending the request for acquiring the identity information of the device to the IP address; or
broadcasting the request for acquiring the identity information of the device.

14. The router of claim 11, wherein the identity information comprises a device identifier and a device random number of the device; and
wherein the identity information is configured to cause the server to determine, according to the identity information, a source of the device and whether initialization is completed; and in response to the source being legal and the initialization not being completed, the verification result is legal.

15. The router of claim 11, wherein the second network configuration information is acquired by the control end of the device according to a two-dimensional code generated by using the username and the access password in the first network configuration information; and the first network configuration information comprises: the username, the access password, and a device identifier and a device random number of the device.

16. A device, comprising:
a processor; and
a memory for storing instructions executable by the processor;
wherein the processor is configured to:
receive, after establishing a first wireless connection with a router, a request for acquiring identity information of the device from the router, and acquire a two-dimensional code representing a username and an access password from a control end of the device;
send an identity data packet to the router, and send second network configuration information to the router;
generate the second network configuration information based on the username and the access password; and
establish, after sending the second network configuration information to the router, a second wireless connection with the router to complete network configuration.

17. The device of claim 16, wherein the processor is further configured to:
send network configuration success information to the control end.

18. The device of claim 16, wherein the processor is further configured to:
broadcast, in response to the device in an access mode, a data packet, wherein the data packet comprises a network identifier.

19. The device of claim 16, wherein the processor is further configured to:
send an Internet protocol (IP) address of the device to the router via the first wireless connection, and receive, via the IP address, the request for acquiring the identity information of the device; or
receive the request for acquiring the identity information of the device broadcast by the router.

20. The device of claim 16, wherein the identity information comprises a device identifier and a device random number of the device; and
wherein the identity information is configured to cause a server to determine, according to the identity information, a source of the device and whether initialization is completed; and in response to the source being legal and the initialization being not completed, a verification result is legal.

\* \* \* \* \*